April 20, 1954     I. J. PICKERING     2,676,231
ELECTRODE HOLDER FOR ARC WELDING
Filed Oct. 5, 1951
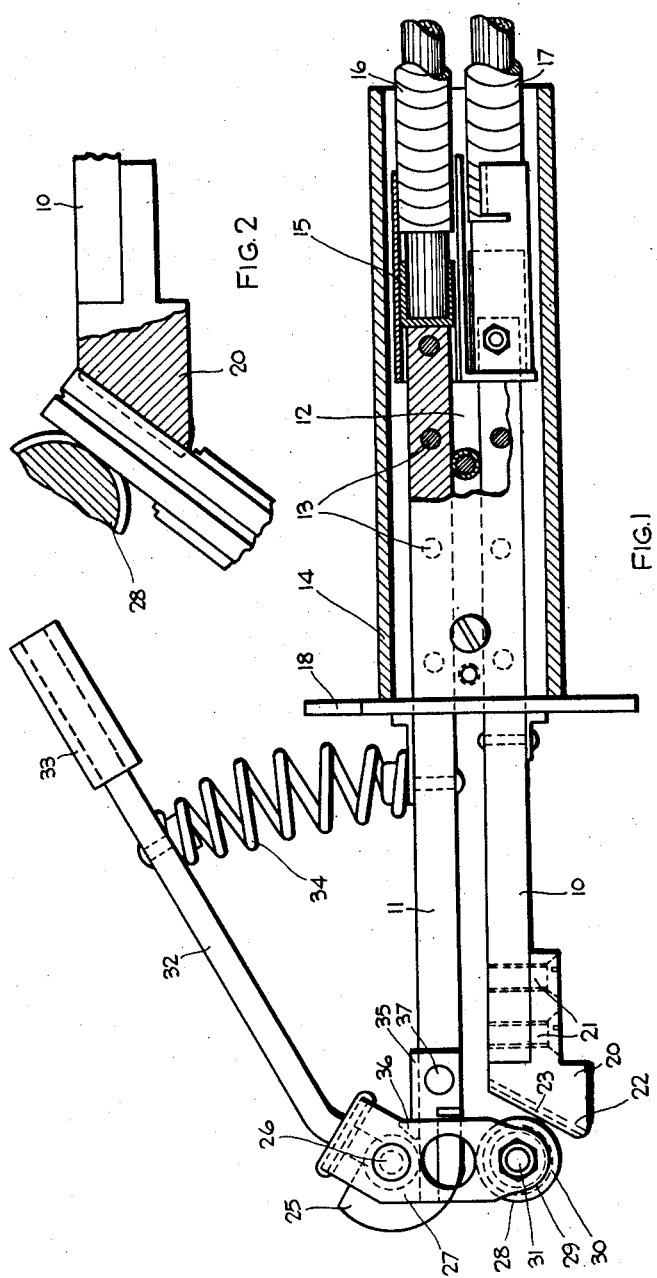
INVENTOR.
IAN JACK PICKERING
BY
ATTORNEY

UNITED STATES PATENT OFFICE 2,676,231

ELECTRODE HOLDER FOR ARC WELDING

Ian Jack Pickering, Birmingham, England, assignor to The General Electric Company Limited, London, England Application October 5, 1951, Serial No. 249,901

8 Claims. (Cl. 219—8)

The present invention relates to electrode holders for arc welding and is especially concerned with holders for electrodes used in systems using two-phase welding current.

Where a two-phase supply has been employed for electric welding it has been found convenient to secure together the two welding electrodes so that they form a single mechanical structure but are, of course, insulated from one another electrically. The mechanical bonding of the two electrodes together can be effected for example by the use of the flux composition which normally surrounds the welding electrodes. Such electrodes will hereafter be referred to as double electrodes.

It is an object of the present invention to provide a construction of holder for a double welding electrode of robust and simple construction. The present invention is especially directed to the arrangement of the means for clamping and gripping the bared ends of the two electrodes of a double electrode.

According to the present invention a welding electrode holder for use with two-phase welding current systems comprises two arms electrically insulated from each other, one of said arms having at, or adjacent its extremity, a surface or surfaces adapted to engage the bared end of one of the electrodes of the double electrode while the other arm provides a fulcrum for a lever having one or more surfaces adapted to engage the bared end of the other electrode of the double electrode, and resilient means tending to urge said surfaces towards each other to engage and grip the bared ends of the electrodes of the double electrode between them.

Advantageously the extremity of the fixed arm may be provided with one or more V-shaped notches of a convenient size for receiving and engaging the bared end of an electrode, while the lever carries a roller having grooves corresponding to the grooves in the extremity of the fixed arm. A feature of this invention consists in providing the fulcrum for the lever by bending the extremity of the longer arm in a direction away from the shorter arm to provide a recess which can be entered by a fulcrum pin carried by the lever and providing a locking member for securing the fulcrum pin in this recess. The locking member may consist of a slider movable along the longer arm and which, with the recess formed by the bent extremity of the longer arm, is arranged to extend more than half way round the fulcrum pin so as to prevent said pin from moving out of the recess. The lever may be connected to an operating member which is urged by a spring in the direction tending to urge the co-operating parts of the lever and of the extremity of the shorter arm towards each other to engage the bared ends of the electrodes of the double electrode.

One form of construction in accordance with the present invention will now be described by way of example with reference to the accompanying drawings in which Figure 1 is a view partly in section and Figure 2 is a fragmentary view showing the way in which the bared ends of the electrodes are gripped.

Referring to the drawings, the welding electrode holder comprises two arms 10 and 11 which are insulated from one another and are secured in parallel relationship by side plates 12 of insulating material secured by rivets such as 13. At one end the arms 10 and 11 extend into a housing formed by a tube 14 of insulating material which surrounds one end of each arm. The arm 11 is connected by a cable ferrule such as 15 to a cable such as 16 by which welding current is fed through an arm to one of the electrodes. Similar arrangements are provided for feeding current from another cable 17 to the arm 10.

At their ends remote from the cables 16 and 17 the arms 10 and 11 extend through a handshield 18 which is secured to the tubular housing 14 and extend beyond the housing for some distance so that the housing is spaced away from the welding arc. At its end the arm 10 has a block 20 secured to it by means of fixing screws 21. The block 20 has formed in its extremity two parallel V-shaped grooves 22 and 23 of different depths. The deeper groove 22 is suitable for accommodating large diameter electrodes while the smaller groove 23 is suitable for the smaller sizes of electrode for which the welding electrode holder is designed. As shown in the drawing the face in which the grooves 22 and 23 are formed is inclined at an angle to the axis of the welding electrode holder. In the arrangement shown the angle is about 120°, but it is to be understood that this angle may be altered as desired so that the electrodes, which extend generally parallel to this surface, are arranged to provide a convenient working condition for the operator. If desired, for example, the surface of the block 20 in which the grooves 22 and 23 are formed may be arranged generally at right angles to the length of the arms 10 and 11. The longer arm 11 is bent as indicated at 25 so as to provide at its side remote from the shorter arm 10 a part-cylindrical recess which may subtend an angle of, say, 120° to 150°. This recess is engaged by the fulcrum pin 26 of a lever which is in the form of a stirrup 27 having limbs extending on either side of the longer arm 11 and carrying at its lower end a roller 28 having circumferential grooves 29 and 30 of approximately the same depth as the grooves 22 and 23 formed in the end face of the block 20. The roller 28 is secured to the stirrup 27 by a bolt 31 which can be tightened up to secure the roller 28 in any desired position. In the drawing the roller 28 is shown as being concentric with the bolt 31 so that the roller can be turned about the bolt so as to present a fresh gripping surface to the electrode in the event of the surface being damaged. It is, however, to be understood that if desired the roller 28 may be made eccentric so that by rotating it about the bolt and thereafter locking it in position by tightening the bolt 31 the spacing between the roller 28 and the gripping surface of the block 20 can be adjusted. Secured to the upper end of the stirrup 27 is an operating handle 32 provided with a hand grip 33 at its upper end. The operating handle 32 is acted upon by a compression spring 34 which is arranged to urge the lever to move about the fulcrum constituted by the pin 26 to urge the roller 28 towards the inclined end surface of the block 20. The direction of action of the spring 34 is arranged to be such that it tends to retain the fulcrum pin 26 in the recess provided by the bent end 25 of the longer arm 11. In addition, a locking device in the form of a sleeve 35 slidable along the arm 11 is provided for preventing the fulcrum pin 26 from moving out of the recess. The locking slider 35 has an upwardly projecting end 36 which co-operates with the bent up end 25 of the arm 11 to extend more than half way round the fulcrum pin 26. The locking slider 35 is secured in position by means of a split pin 37 extending through the arm 11 or by any other convenient means.

In use, as shown in Figure 2, the bared ends of the electrodes which together form the double welding electrode are gripped between the block 20 and the roller 28, being held in the grooves therein. The dimensions of the grooves are so chosen that when the smallest size of electrode for which the grooves are designed is inserted in the holder the roller 28 is separated from the block 20, the roller 28 making contact with one of the electrodes while the block 20 makes contact with the other electrode.

The simple construction of this holder permits easy replacement of the block 20 or the roller 28 which make contact with the bared ends of the electrodes of the double electrode.

It will be appreciated that if desired the block 20 and the roller 28 may be provided with more than two different depths of groove so that they may be used for a wide range of sizes of electrode.

I claim:

1. A welding electrode holder for use with two-phase welding current systems comprising two current carrying arms flanking one another, connections for supplying electric current to said arms, solid electrical insulation between said arms towards one end and air insulation between said arms towards and at the other end, a surface adapted to engage the bared end of one of the electrodes of the double electrode at the air insulated end of one of said arms, a lever having a surface adapted to engage the bared end of the other electrode of the double electrode, a fulcrum for said lever on the other arm, and resilient means tending to urge said surfaces towards each other to engage and grip the bared ends of the electrodes of the double electrode between them.

2. A welding electrode holder according to claim 1 wherein the surfaces for engaging the bared ends of the electrodes are provided by V-shaped grooves.

3. A welding electrode holder according to claim 2 wherein grooves of different depths are provided for accommodating different sizes of electrode.

4. A welding electrode holder for use with two-phase welding current systems comprising two current carrying arms flanking one another, connections for supplying electric current to said arms, solid electrical insulation between said arms towards one end and air insulation between said arms towards and at the other end, a surface adapted to engage the bared end of one of the electrodes of the double electrode at the air insulated end of one of said arms, a lever carrying a roller having an annular groove providing a surface adapted to engage the bared end of the other electrode of the double electrode, a fulcrum for said lever on the other arm, and resilient means tending to urge said surfaces towards each other to engage and grip the bared ends of the electrodes of the double electrode between them.

5. A welding electrode holder according to claim 4 wherein the roller is rotatable to present a fresh portion of the groove therein for engagement with the bared end of one of the electrodes.

6. A welding electrode holder according to claim 4 wherein the roller carried by the lever can be turned about an axis eccentric to the axis of the roller so as to adjust the spacing between the roller and the electrode-engaging surface at the end of the first mentioned arm.

7. A welding electrode holder for use with two-phase welding current systems comprising two current carrying arms extending parallel to one another in spaced relationship and electrically insulated from one another, connections for supplying electric current to each of said arms, a surface at the end of one of said arms adapted to engage the bared end of one electrode of the double electrode, a lever having a surface adapted to engage the bared end of the other electrode of the double electrode, a fulcrum for said lever on said other arm, and resilient means tending to urge said surfaces towards each other to engage and grip the bared ends of the electrodes of the double electrode between them.

8. A welding electrode holder according to claim 7, wherein the electrode-engaging surface on the lever is provided by a V-shaped annular groove in a rotatable roller.

References Cited in the file of this patent

UNITED STATES PATENTS

| Number | Name | Date |
| --- | --- | --- |
| 1,371,094 | Holslag | Mar. 8, 1921 |
| 1,841,214 | Saives | Jan. 12, 1932 |
| 2,044,058 | Bustamante | June 16, 1936 |
| 2,376,943 | Smith | May 29, 1945 |
| 2,379,777 | Zeilstra | July 3, 1945 |
| 2,416,872 | Garibay | Mar. 4, 1947 |

FOREIGN PATENTS

| Number | Country | Date |
| --- | --- | --- |
| 200,639 | Great Britain | July 19, 1923 |
| 301,660 | Great Britain | Dec. 6, 1928 |